United States Patent
Hamilton, II et al.

(10) Patent No.: US 9,736,092 B2
(45) Date of Patent: *Aug. 15, 2017

(54) PREFERRED NAME PRESENTATION IN ONLINE ENVIRONMENTS

(71) Applicant: INTERNATIONAL BUSINESS MACHINES CORPORATION, Armonk, NY (US)

(72) Inventors: Rick A. Hamilton, II, Charlottesville, VA (US); Richard J. Newhook, West Chester, PA (US); M Shafer Ramsey, Westminister, MD (US); James W. Seaman, Falls Church, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,696

(22) Filed: Jun. 26, 2015

(65) Prior Publication Data

US 2015/0295864 A1     Oct. 15, 2015

Related U.S. Application Data

(63) Continuation of application No. 12/416,967, filed on Apr. 2, 2009, now Pat. No. 9,100,435.

(51) Int. Cl.
| | | |
|---|---|---|
| *G06F 15/16* | (2006.01) | |
| *H04L 12/58* | (2006.01) | |
| *H04L 29/12* | (2006.01) | |
| *H04L 29/08* | (2006.01) | |

(52) U.S. Cl.
CPC ...... *H04L 51/046* (2013.01); *H04L 29/12066* (2013.01); *H04L 61/1511* (2013.01); *H04L 61/301* (2013.01); *H04L 67/10* (2013.01)

(58) Field of Classification Search
CPC ............. H04L 29/12066; H04L 51/046; H04L 61/1511; H04L 61/301; H04L 67/10
USPC ......................................................... 709/219
See application file for complete search history.

(56) References Cited

U.S. PATENT DOCUMENTS

| | | |
|---|---|---|
| 5,604,855 A | 2/1997 | Crawford |
| 5,802,296 A | 9/1998 | Morse et al. |
| 5,956,039 A | 9/1999 | Woods et al. |
| 6,215,498 B1 | 4/2001 | Filo et al. |
| 6,329,986 B1 | 12/2001 | Cheng |
| 6,476,830 B1 | 11/2002 | Farmer et al. |
| 6,545,682 B1 | 4/2003 | Ventrella et al. |
| 6,591,291 B1 | 7/2003 | Gabber et al. |
| 6,643,687 B1 | 11/2003 | Dickie et al. |

(Continued)

OTHER PUBLICATIONS

Langberg, Mike, "Virtual World There Innovative to an Extend", San Jose Mercury News, Nov. 27, 2003 (pp. 1-3).

(Continued)

*Primary Examiner* — Normin Abedin
(74) *Attorney, Agent, or Firm* — Lisa J. Ulrich; Matthew M. Hulihan; Heslin Rothenberg Farley & Mesiti PC

(57) ABSTRACT

The present invention allows an on-line user to specify the name by which that user is known when communicating with other target users, regardless of the name under which the sending user is currently logged-in. The invention also provides a mechanism to block messages from sending parties that are not willing to divulge their real identity.

20 Claims, 6 Drawing Sheets

(56) References Cited

U.S. PATENT DOCUMENTS

| | | | |
|---|---|---|---|
| 7,213,206 B2 | 5/2007 | Fogg | |
| 7,342,587 B2 | 3/2008 | Danzig et al. | |
| 7,386,799 B1 | 6/2008 | Clanton et al. | |
| 7,401,295 B2 | 7/2008 | Aldrich et al. | |
| 7,669,123 B2 | 2/2010 | Zuckerberg et al. | |
| 7,673,003 B2 | 3/2010 | Little, II | |
| 7,698,380 B1 | 4/2010 | Amidon et al. | |
| 7,703,030 B2 | 4/2010 | Smirin et al. | |
| 7,725,492 B2 | 5/2010 | Sittig et al. | |
| 7,801,971 B1 | 9/2010 | Amidon et al. | |
| 7,802,290 B1 | 9/2010 | Bansal et al. | |
| 7,930,255 B2 | 4/2011 | Choi et al. | |
| 7,970,837 B2* | 6/2011 | Lyle | H04L 12/581 709/205 |
| 8,332,913 B2 | 12/2012 | Dawson et al. | |
| 8,578,009 B1* | 11/2013 | Newstadt | G06Q 10/107 709/206 |
| 8,677,254 B2 | 3/2014 | Finn et al. | |
| 2002/0065795 A1 | 5/2002 | Asherman | |
| 2003/0014423 A1 | 1/2003 | Chuah et al. | |
| 2003/0177187 A1 | 9/2003 | Levine et al. | |
| 2003/0229717 A1* | 12/2003 | Teague | G06Q 10/107 709/246 |
| 2004/0064734 A1 | 4/2004 | Ehrlich | |
| 2004/0148346 A1 | 7/2004 | Weaver et al. | |
| 2004/0179039 A1 | 9/2004 | Blattner et al. | |
| 2004/0192386 A1 | 9/2004 | Aerrabotu et al. | |
| 2004/0205173 A1 | 10/2004 | Hall | |
| 2004/0221224 A1 | 11/2004 | Blattner et al. | |
| 2004/0255122 A1 | 12/2004 | Ingerman et al. | |
| 2005/0022206 A1 | 1/2005 | Evans et al. | |
| 2005/0143138 A1 | 6/2005 | Lee et al. | |
| 2005/0223328 A1 | 10/2005 | Ashtekar et al. | |
| 2006/0009994 A1 | 1/2006 | Hogg et al. | |
| 2006/0053388 A1 | 3/2006 | Michelman | |
| 2006/0053389 A1 | 3/2006 | Michelman | |
| 2006/0059238 A1 | 3/2006 | Slater et al. | |
| 2006/0062363 A1 | 3/2006 | Albrett | |
| 2006/0128460 A1 | 6/2006 | Muir et al. | |
| 2006/0148528 A1 | 7/2006 | Jung et al. | |
| 2006/0248573 A1 | 11/2006 | Pannu et al. | |
| 2007/0093299 A1 | 4/2007 | Bergeron et al. | |
| 2007/0162862 A1 | 7/2007 | Ogasawara et al. | |
| 2007/0243936 A1 | 10/2007 | Binenstock et al. | |
| 2008/0020361 A1 | 1/2008 | Kron et al. | |
| 2008/0030496 A1 | 2/2008 | Lee et al. | |
| 2008/0086696 A1 | 4/2008 | Prakash et al. | |
| 2008/0092225 A1 | 4/2008 | Nieuwenhuis | |
| 2008/0120376 A1 | 5/2008 | Allsop | |
| 2008/0120558 A1 | 5/2008 | Nathan et al. | |
| 2008/0201638 A1 | 8/2008 | Nair | |
| 2008/0207331 A1 | 8/2008 | Beale | |
| 2009/0037822 A1 | 2/2009 | Kandekar et al. | |
| 2009/0106672 A1 | 4/2009 | Burstrom | |
| 2009/0150418 A1 | 6/2009 | Shuster | |
| 2009/0157813 A1 | 6/2009 | Jung et al. | |
| 2009/0163278 A1 | 6/2009 | Kawanaka et al. | |
| 2009/0172539 A1 | 7/2009 | Bates et al. | |
| 2009/0210483 A1* | 8/2009 | Pierce | A63F 13/12 709/203 |
| 2009/0240629 A1 | 9/2009 | Xie et al. | |
| 2009/0307189 A1 | 12/2009 | Bobbitt et al. | |
| 2010/0106512 A1* | 4/2010 | Hyndman | G06Q 10/10 705/1.1 |
| 2010/0164947 A1 | 7/2010 | Bolger et al. | |
| 2010/0250605 A1 | 9/2010 | Pamu et al. | |
| 2010/0273546 A1 | 10/2010 | Lior et al. | |
| 2011/0078088 A1 | 3/2011 | Dawson et al. | |
| 2013/0014033 A1* | 1/2013 | Hamick | G06Q 50/01 715/757 |

OTHER PUBLICATIONS

Duncan, Geoff, "Second Life Rolls Out ID Verification", Aug. 31, 2007, http://news.digitaltrends.com/news/story/14051/second_life_rolls_out_id_verification (1 page).

Selvarajah et al., "The Use of Emotions to Create Believable Agents in a Virtual Environment", AAMAS'05, Utrecht, Netherlands (Jul. 25-29, 2005) (pp. 13-20).

Jackson et al., "Collaboration and Learning Within Immersive Virtual Reality", CVE Jan. 2000, San Fransisco, CA (pp. 83-92).

Maldonado et al., "We Learn Better Together: Enhancing e-Learning with Emotional Characters", Computer Supportive Collaborative Learning: The Next Ten Years, Proceedings of the 6th International Computer Supported Collaborative Learning Conference (CSCL) (May 30, 2005) (pp. 408-417).

Zanbaka et al., "Can a Virtual Cat Persuade You? The Role of Gender and Realism in Speaker Persuasiveness", CHI 2006 Proceedings, Beliefs and Affect, Montreal, Quebec, Canada, (Apr. 22-27, 2006) (pp. 1153-1162).

Bailenson et al., "Interaction in Collaborative Virtual Environments", Presence, vol. 15, No. 6 (Dec. 2006) (pp. 669-716).

Office Action in U.S. Appl. No. 12/416,967, dated Jan. 4, 2011, 19 pages.

Office Action in U.S. Appl. No. 12/416,967, dated Jan. 25, 2013, 18 pages.

Office Action in U.S. Appl. No. 12/416,967, dated Feb. 4, 2014, 7 pages.

Office Action in U.S. Appl. No. 12/416,967, dated Mar. 22, 2012, 19 pages.

Office Action in U.S. Appl. No. 12/416,967, dated May 4, 2011, 16 pages.

Office Action in U.S. Appl. No. 12/416,967, dated Jun. 19, 2013, 15 pages.

Office Action in U.S. Appl. No. 12/416,967, dated Jun. 24, 2014, 13 pages.

Office Action in U.S. Appl. No. 12/416,967, dated Aug. 31, 2012, 19 pages.

Office Action in U.S. Appl. No. 12/416,967, dated Oct. 20, 2011, 15 pages.

Office Action in U.S. Appl. No. 12/416,967, dated Oct. 24, 2013, 15 pages.

Notice of Allowance in U.S. Appl. No. 12/416,967, dated Nov. 6, 2014, 8 pages.

Notice of Allowance in U.S. Appl. No. 12/416,967, dated Mar. 26, 2015, 16 pages.

* cited by examiner

PREFERRED NAME PRESENTATION IN ONLINE ENVIRONMENTS

CROSS REFERENCE TO RELATED APPLICATIONS

This application is a continuation of U.S. patent application Ser. No. 12/416,967 filed Apr. 2, 2009 entitled, "PREFERRED NAME PRESENTATION IN ONLINE ENVIRONMENTS." The above application is incorporated herein by reference in its entirety.

CROSS REFERENCE TO CO-PENDING APPLICATION

Commonly owned U.S. patent application Ser. No. 12/045,757, entitled "Fraud Mitigation through Avatar Identity Determination," filed on Mar. 11, 2008, contains subject matter related, in certain aspects, to the subject matter of the present application. The above-identified patent application is incorporated herein by reference in its entirety.

FIELD OF THE INVENTION

The present invention is generally directed to a system and method for providing an avatar, that is, a user having an on-line alias, with a mechanism for communicating with other users electronically, and based on context, present a desired name to the target party regardless of the currently active alias of the sender. More particularly, the present invention is directed to processes and systems variously described as Alias Resolution, Name Resolution, Alias Translation, Name Translation, Alias Conversion and Name Conversion in virtual universes.

BACKGROUND OF THE INVENTION

In a virtual environment, alias names are used to preserve privacy, and yet there is often a need to know the identity of the real person with whom one is talking or interacting in order to hold meetings and conduct business. The inverse is also true, where an on-line user does not want to disclose a real name and wishes for disparate target parties to know the user under disparate on-line alias names. In modern society, most on-line users have multiple on-line alias names, some of which may include real identity data. As an example, a user's business e-mail address may contain a real name, where the same user may have additional email addresses, on-line gaming aliases, virtual world aliases, and the like, which often do not include identity data. As the world of on-line communication grows smaller, most of these environments provide external communication mechanisms, such as chat, so that an alias in one environment can communicate with an alias in a disparate environment. A problem arises, however, when an Avatar/alias needs to communicate to another on-line user, but does not wish to be known by the current on-line alias. As an example, a user currently playing World of Warcraft® may be logged-on using the alias MegaMonster. If that user has a need or desire to communicate with a business associate, it is unlikely that they would want to send an email, establish a chat session, or otherwise make contact using the identity of MegaMonster. This invention solves this problem by providing a system and method to control and manage identity presentation in on-line environments.

A virtual world is a computer-based simulated environment intended for its users to inhabit and interact via avatars. This habitation usually is represented in the form of two or three-dimensional graphical representations of humanoids (or other graphical or text-based avatars). Some, but not all, virtual worlds allow for multiple users.

The world being computer-simulated typically appears similar to the real world, with real world rules such as gravity, topography, locomotion, real-time actions, and communication. Communication has, until recently, been in the form of text, but now real-time voice communication using VOIP is available. This type of virtual world is now most common in massively multi-player on-line games (Second Life®, Entropia Universe®, The Sims On-Line™, There™, particularly massively multiplayer on-line role-playing games such as EverQuest®, Ultima On-Line™, Lineage™, World of Warcraft®, or Guild Wars™. Second Life® and other on-line virtual environments present a tremendous new outlet for both structured and unstructured virtual collaboration, gaming and exploration, as well as real-life simulations in virtual spaces. These activities, along with yet to be disclosed new dimensions, in turn provide a wide open arena for creative and new marketing methods and mechanisms.

It should not be assumed that the utility of virtual worlds is limited to game playing, although that is certainly seen to be useful and valuable insofar as it has become a real economic reality with real dollars being exchanged. However, the usefulness of virtual worlds also includes the opportunity to run corporate conferences and seminars. It is also used to conduct virtual world classroom sessions. Governmental and instructional opportunities abound in the virtual world. Accordingly, it should be fully appreciated that the term "virtual" as applied to this technology does not in any way make it less real or less valuable than the "real" world. It is really an extension of current reality. Moreover, it is an extension that greatly facilitates human communication and interaction in a non-face-to-face fashion.

SUMMARY OF THE INVENTION

The present invention allows an on-line user to specify the name or alias by which that user is known when communicating with other target users, regardless of the name or alias under which the sending user is currently logged-in. It also provides a mechanism to block messages from sending parties that are not willing to divulge real identity.

In accordance with one embodiment of the present invention a method is given for providing appropriate and selective identities for user messages in a virtual universe, by establishing an association between a user and at least two aliases for use on different accounts in the virtual universe. A name conversion agent, having target information and user defined rules for these aliases, is enabled. A user identity is determined by the name conversion agent using the target information, selected or specified rules and the alias information.

In a further embodiment of the present invention, a computer readable medium containing program instructions thereon, for a data processing system is provided. The data processing system establishes an association between the user and at least two aliases for use on different accounts in said virtual universe. The data processing system enables a name conversion agent having target information and user defined rules for the aliases and determines a user identity via the agent, using the target information, the rules and the aliases.

In yet a further embodiment of the present invention, there is described a data processing system whose memory includes program instructions, for: (1) establishing an association between the user and at least two aliases for use on different accounts in a virtual universe; (2) enabling a name conversion agent having target information and user defined rules for the aliases; and (3) determining a user identity by the agent using the target information, the rules and the aliases.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

The present invention is related to U.S. patent application Ser. No. 12/045,757, originally titled "System for Fraud Mitigation through Avatar Identity Determination", now issued as U.S. Pat. No. 8,332,913 on Dec. 11, 2012, where methods are described to ascertain the true identity of the human user behind an Avatar or other on-line alias. This invention expands upon the previous methods and provides controls for a message sender and target in managing name/alias presentation.

In order to better understand the present invention and the advantages that it produces, it is useful to provide descriptions of some of the VU concepts and terms that are encountered. The list below is exemplary and is not intended to be all inclusive.

(1) An avatar is a graphical representation a user selects that other users can see, often taking the form of a cartoon-like human but with increasing desire to render the depiction in more realistic fashion.

(2) An agent is the user's account, upon which the user can build an avatar, and which is tied to the inventory of assets a user owns.

(3) A region is a virtual area of land within the VU, typically residing on a single server.

(4) Assets, avatars, the environment, and anything visual consists of UUIDs (unique identifiers) tied to geometric data (distributed to users as textual coordinates), textures (distributed to users as graphics files such as JPEG2000 files), and effects data (rendered by the user's client according to the use's preferences and user's device capabilities).

Note too that, throughout this disclosure, for clarity of presentation only, reference is made to an individual or avatar, which is a digital representative of the individual. However, it should be noted that this term not only applies to an individual, but also to any computerized processes that may execute on behalf of the individual, using the same credentials and capabilities of the individual that owns/controls the process. In general, this embodies many forms, such as prescheduled, automatically running maintenance processes, system level processes (owned by the system administrator), etc. In all cases, this process is treated like an avatar, with the same inputs and outputs, regardless of whether the credentials come directly from an individual or from a computerized process acting in his or her stead.

Figure 3:
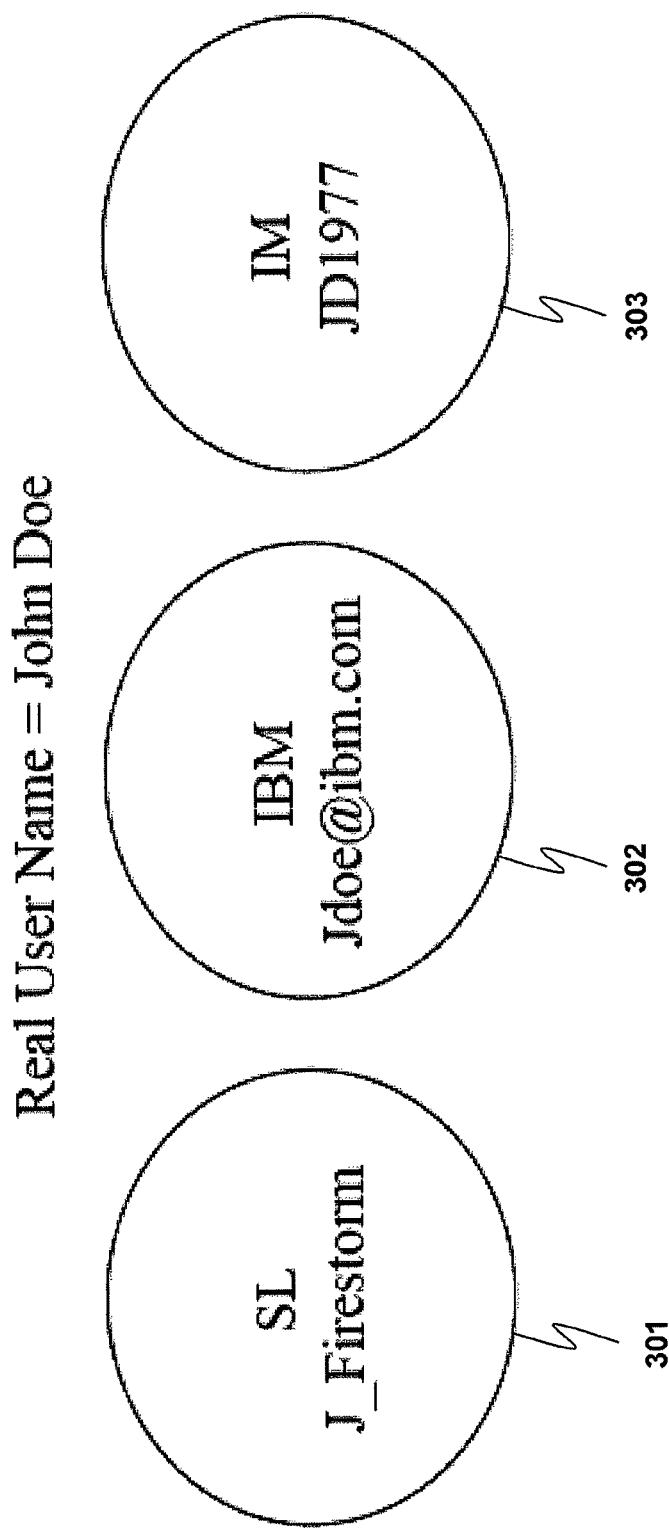
FIG. 3 is a block diagram illustrating the name conversion process as employed by a first client communicating with a second client.

The present invention allows an on-line user with multiple virtual identities (alias names) to communicate with other users while presenting a desired identity to a target party. As an example, real user John Doe may have a work account at IBM of jdoe@ibm.com (see reference numeral 302 in FIG. 3), a Second Life® account with an alias of J_Firestorm (see reference numeral 301 in FIG. 3), and an Instant Messenger (IM) account with an alias of JD1977 (see reference numeral 303 in FIG. 3). Each of these accounts is associated with John Doe, but each uses a different on-line alias name.

Figure 2:
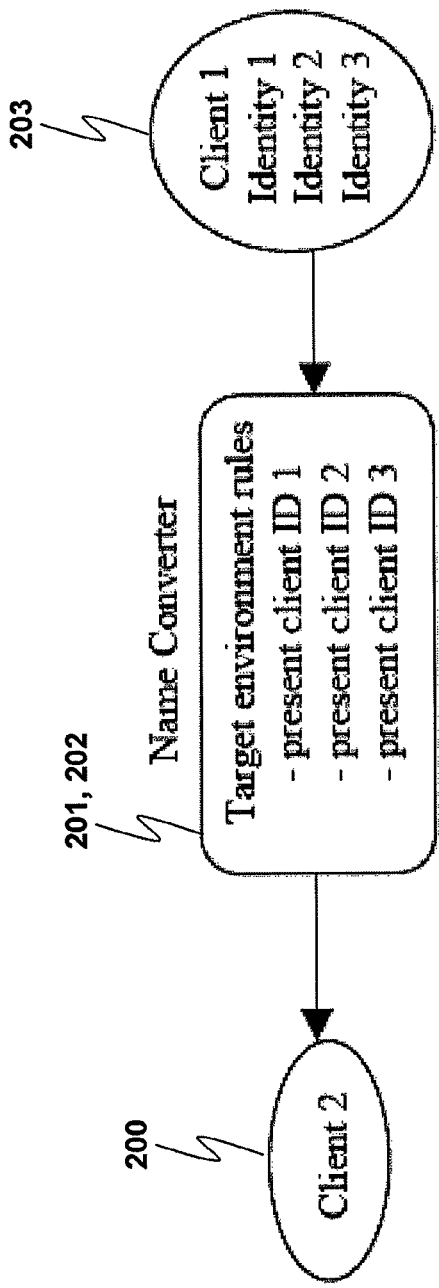
FIG. 2 illustrates a model in which a single real name is associated with three aliases.

The present invention enables user John Doe to communicate with others identifying himself as any of the alias names (see reference numeral 203 in FIG. 2), regardless of which alias is currently active. As an example, if John Doe is currently in an IM session and sends a note to a colleague at work, he could address such a note as coming from jdoe@ibm.com, even though the currently active IM ID is JD1977.

Figure 1:
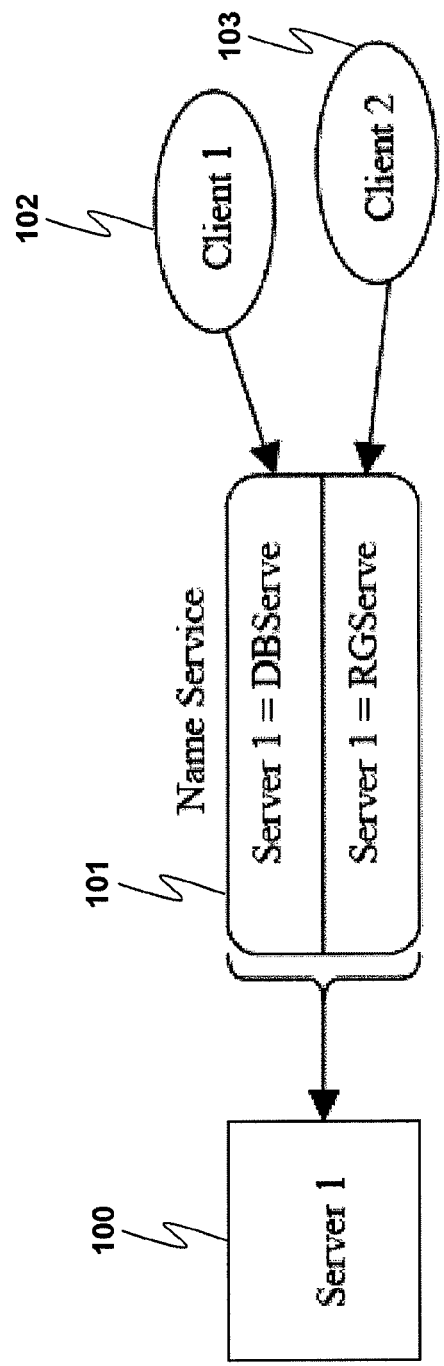
FIG. 1 is a block diagram illustrating the use of a name service by two clients communicating with a server such as one hosting a virtual world.

Name service solutions, such as Domain Name Services (DNS), exist in which multiple clients can refer to a single server by different names, and each client has the server name translated and connects to the server. However, the present invention is used so that the clients do not actually have to know the real name of the physical server in order to connect to a service. FIG. 1 depicts a name services scenario for clients (102 and 103) using name service 101 in order to access server 100.

Name Conversion Agent and Database

In a preferred embodiment, the present invention is enabled through the use of agent code and a name conversion database. A Name Conversion Agent runs on the client machine and, based on message context (target information) and user defined rules, either passes the message as is or modifies the sender's identify information according to the rules. In another embodiment, this functionality is integrated into the individual applications or is accomplished using an application programming interface (API).

Figure 4:
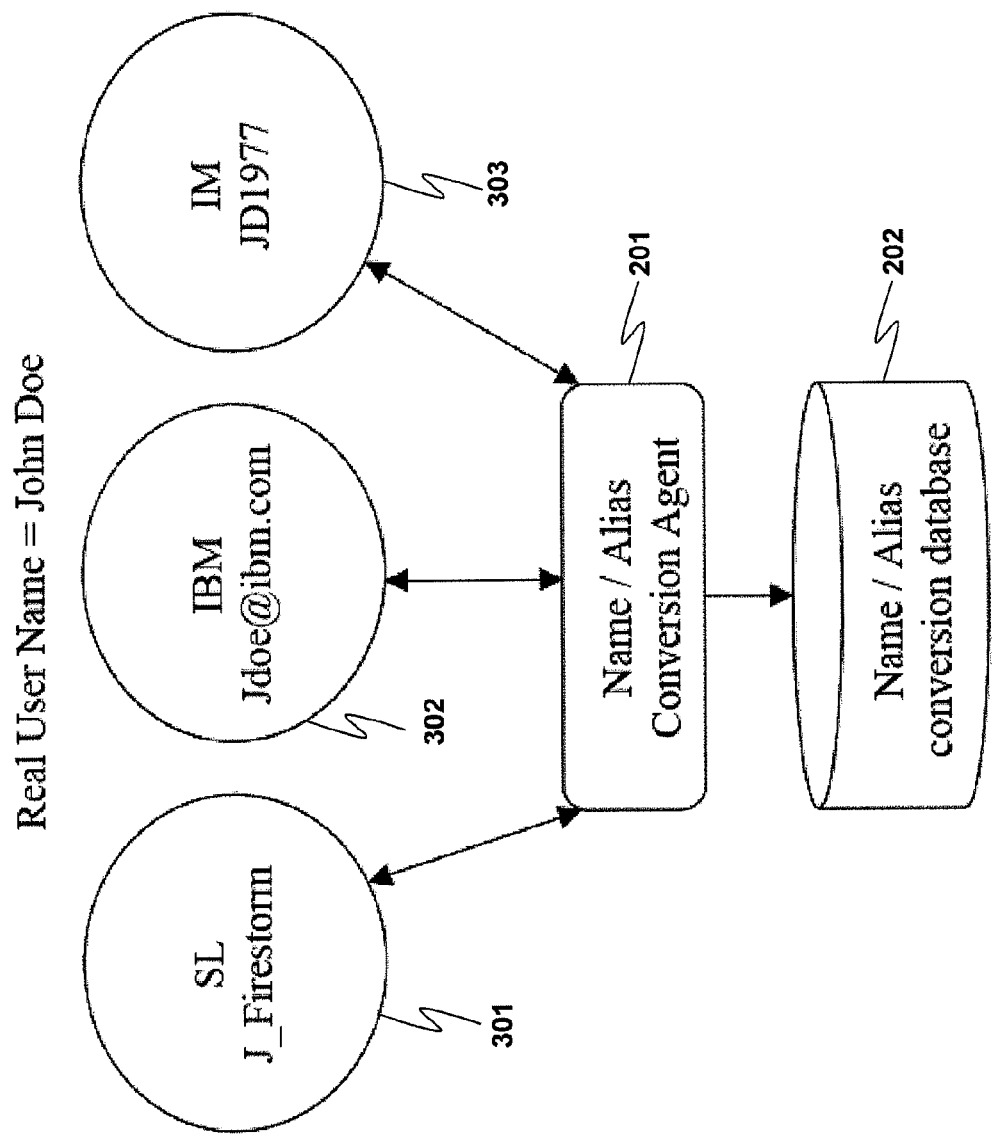
FIG. 4 is a process flow diagram illustrating the use of a name/alias conversion agent and a name/alias conversion database.

Additionally, in preferred embodiments there is a registration process in which user John Doe is only permitted to use alias IDs that he actually owns, and is not permitted to spoof another user's alias names. This is accomplished by sending a onetime message to the agent (see reference numeral 201 in FIG. 4) from each active ID. For example, during an IM session a user sends a message to NameAgent@IM to register new IM name. The Agent recognizes this as a registration request and adds JD1977 to the alias database (see reference numeral 202 in FIG. 4). Upon registration of an ID, John Doe then has the ability, through the agent, to establish rules for that ID. FIG. 4 depicts high level component interaction.

The present invention expands upon existing name services by providing a client with the ability to present a preferred identity to either an existing name service, to a server, or to another client, regardless of the current active client ID.

As each alias is registered and rules are configured, and the data is written to a name conversion database that stores each contextual relationship, thus establishing name association rules. In a preferred embodiment, data from the Name Conversion Database is cached by the agent such that name conversions are made very rapidly without the need to read the database for each message sent. The following describes some exemplary name conversion rules.

Name Conversion Rules

The rules now described are exemplary of rules that are desirable for use by the Name Conversion Agent. In preferred embodiments there are two rule sets: one describing specific relationship rules and another providing global rules. Upon receipt of a message, the agent first looks for a specific rule and applies it, followed by scanning global rules if no specific rule was found, and finally passing the message as-is if no rule was found. The following are examples of such rules.

Specific Name Conversion Rules

"Send-message-as" function (send using any valid registered alias)—This rule allows the sender to specify, in real-time, the sending ID that is associated with an outbound message.

Use specific sender name for messages to specific target environment—This rule governs all outbound traffic to a specific target environment. As an example, all messages sent to ibm.com are provided with a sending address of jdoe@ibm.com and all messages sent to Second Life® are provided with a sending address of J-Firestorm.

Use specific sender name to specific target name—This rule governs all outbound traffic to a specific target name. As an example, any messages sent to rick@ibm.com are provided with a sending address of jdoe@ibm.com and any messages sent to rick@aol.com are provided with a sending address of JD1977.

Global Name Conversion Rules

Always translate outbound name to real name—In the absence of any specific rule, this global rule would identify the sender by real name.

Always translate in-world name to in-world name—In the absence of any specific rule, this global rule uses the current contextually based name (for example, IBM name, Second Life® name, IM name)

Always translate other-world name to other-world name—In the absence of any specific rule, this global rule uses the target environment contextually based name. For example, a message sent to Second Life® is provided with a sending address of the sender's Second Life® identity.

Always send using current alias or name—In the absence of any specific rule, this global rule uses the currently active ID as the sender ID (for example, if sending from IM, use sender's IM name).

Blocking Rules

Block messages from all/some in-bound/out-bound unresolvable alias names—In a preferred embodiment, both a sender and receiver have the option of not sending and/or receiving messages from other parties that do not have a real name on record.

It should be noted that each of these rules are used individually and/or jointly to provide the desired outcome.

It should be further noted that the above rules can be applied:

With the use of either an avatar mode, for example, "personal" or "business" wherein any contacts made while the avatar is designated in a certain mode take on an alias translation accordingly.

According to who is being addressed; for example, entry of my manager's avatar name into a look-up table means that messaging addressed between the two of us refers to "Dan" and "Rick" whereas correspondence to others still uses informal names and aliases.

According to the region where the avatar is located. For example, if an avatar is in a corporate region, then real names are used, whereas an avatar in a public region uses the informal names associated with their avatar.

According to time of day or day of week in a designated "home" time zone. For example, when interactions occur during working hours in the home zone, translation is performed accordingly; on a Sunday afternoon, no translation occurs. Time of year or season is also employed.

In yet another embodiment, the present invention provides a business method that performs the process steps of the invention on a subscription, advertising, and/or fee basis. That is, a service provider, such as a Solution Integrator, offers to provide a mechanism for providing selectively appropriate identity for user messages in a virtual universe. In this case, the service provider creates, maintains, supports, et cetera, a computer infrastructure that performs the process steps of the invention for one or more customers. In return, the service provider receives payment from the customer(s) under a subscription and/or fee agreement and/or the service provider receives payment from the sale of advertising content to one or more third parties.

Figure 7:
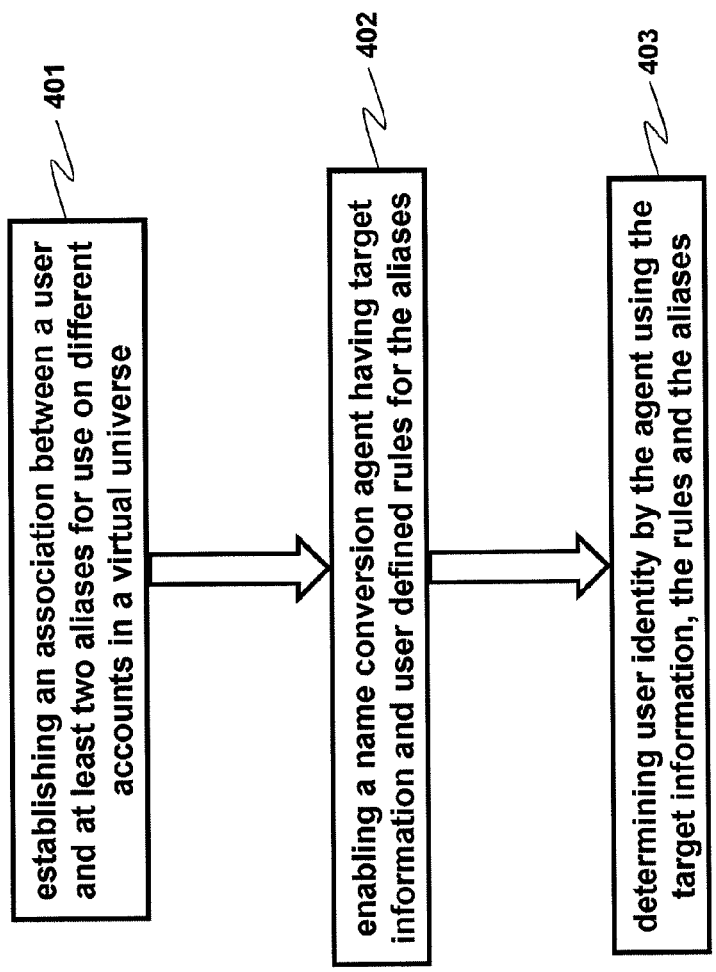
FIG. 7 is a flowchart illustrating exemplary steps in the process of the present invention.

One embodiment of the present invention is illustrated in FIG. 7. In a first step (401), there is established an association between a user and at least two aliases for use on different accounts in a virtual universe. In a second step (402), a name conversion agent having target information and user defined rules for the aliases is enabled. In a third step (403), user identity is determined by the agent using the target information, the rules and aliases.

In summary, this invention provides a convenient mechanism for sending messages to target parties using a desired sender alias without the need to start or change active applications, and is presently very helpful and its utility is only expected to grow as the number of alias identities each individual person owns continues to increase.

Figure 5:
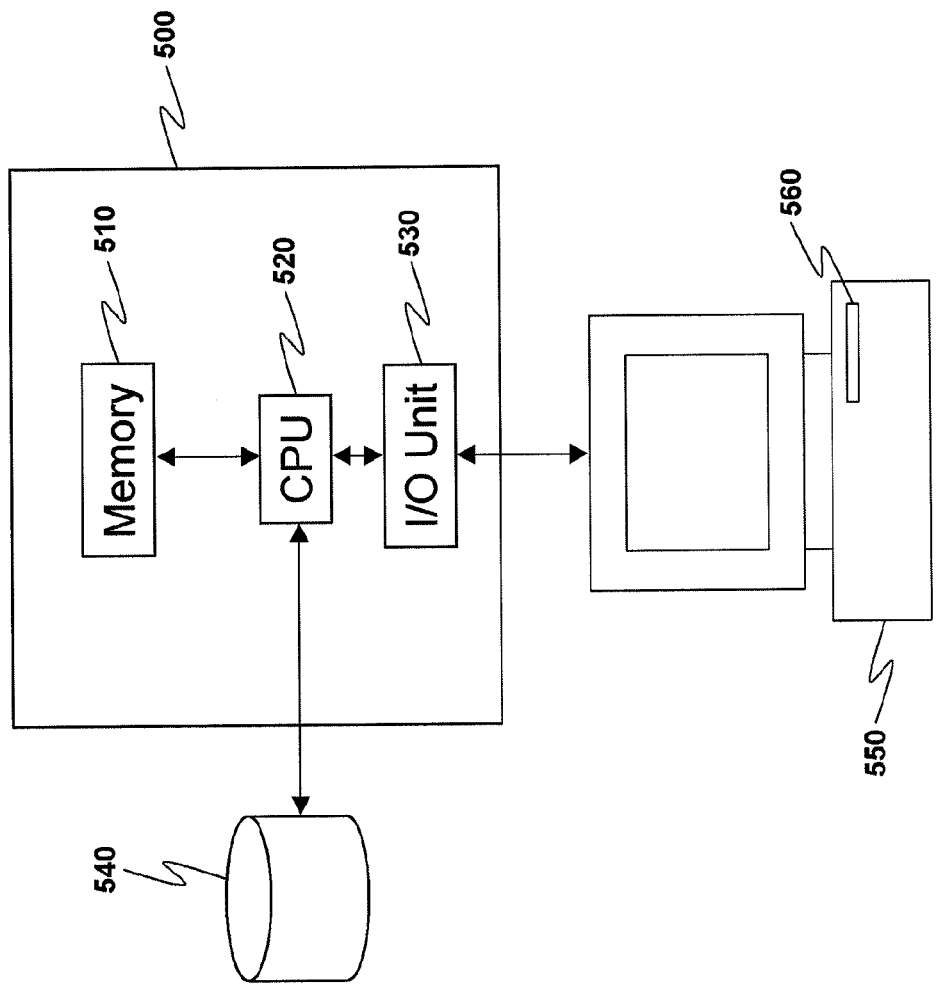
FIG. 5 is a block diagram illustrating a system which an end user typically employs to use the present invention.
Figure 6:
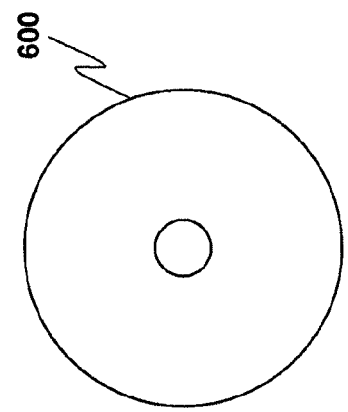
FIG. 6 illustrates one form of machine readable medium, a CD-ROM, on which program instructions for carrying out the steps of the present invention may be provided.

In any event an end user environment in which the present invention operates is shown in FIG. 5. The present invention operates through a data processing environment which effectively includes one or more of the computer elements shown in FIG. 5. While FIG. 5 is more suited for illustrating an end user environment, it is noted that a similar, albeit typically much larger, data processing system is connected via the Internet to the local environment depicted. In particular, a similar non-volatile memory 540 is typically present at the server end to contain program instructions for carrying out the virtual reality program which are loaded into a corresponding main memory 510 for execution. Turning to a local focus, computer 500 includes central processing unit (CPU) 520 which accesses programs and data stored within random access memory 510. Memory 510 is typically volatile in nature and accordingly such systems are provided with nonvolatile memory typically in the form of rotatable magnetic memory 540. While memory 540 is preferably a nonvolatile magnetic device, other media may be employed. CPU 520 communicates with users at consoles such as terminal 550 through Input/Output unit 530. Terminal 550 is typically one of many, if not thousands, of consoles in communication with computer 500 through one or more I/O unit 530. In particular, console unit 550 is shown as having included therein device 560 for reading media of one or more types such as CD-ROM 600 shown in FIG. 6. Media 600, an example of which is shown in FIG. 6, comprises any convenient device including, but not limited to, magnetic media, optical storage devices and chips such as flash memory devices or so-called thumb drives. Disk 600 also represents a more generic distribution medium in the form of electrical signals used to transmit data bits which represent codes for the instructions discussed herein. While such transmitted signals may be ephemeral in nature they still, nonetheless constitute a physical medium carrying the coded instruction bits and are intended for permanent capture at the signal's destination or destinations.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A method comprising:
obtaining an association between a first user of a virtualized universe environment and a plurality of aliases for the first user for use in the virtualized universe environment, the plurality of aliases being for use by the first user in different virtualized universe environment applications of a plurality of virtualized universe environment applications of the virtualized universe environment, the plurality of virtualized universe environment applications comprising an email virtualized universe environment application, an online gaming virtualized universe environment application, and an instant messaging virtualized universe environment application;
based on the first user initiating sending, to a second user, a message from a source virtualized universe environment application of the plurality of virtualized universe environment applications to a target virtualized universe environment application of the plurality of virtualized universe environment applications, the first user logged into the source virtualized universe environment application and the source virtualized universe environment application and target virtualized universe environment application being different virtualized universe environment applications of the plurality of virtualized universe environment applications, determining, by an agent of the client system, an alias, of the plurality of aliases for the first user, to associate with the message to identify for the second user a sending alias of the message, wherein the determined alias to associate with the message is a different alias than an alias under which the first user is logged into the source virtualized universe environment application and the determined alias to associate with the message is for an account for the first user in a different virtualized universe environment application of the plurality of virtualized universe environment applications than the source virtualized universe environment application, and wherein the determining the alias to associate with the message comprises making a determination of the alias based on checking at least one rule of one or more rules specifying circumstances under which the plurality of aliases for the first user are to be used in sending messages;
registering permission for the first user to use the determined alias in sending messages, the registering being based on receiving a message from the first user as the first user is logged into the virtualized universe environment application for which the determined alias is used; and
associating the determined alias with the message to identify for the second user the sending alias for the message as being the determined alias.

2. The method of claim 1, wherein the checking proceeds according to a prioritized rule evaluation order for the one or more rules.

3. The method of claim 1, wherein the making the determination of the alias is based further on target information for the message, the target information comprising context of the message.

4. The method of claim 1, wherein the message is an instant message.

5. The method of claim 1, wherein the agent comprises a name conversion agent and wherein the associating comprises modifying, by the agent, identify information of the message to indicate the determined alias.

6. The method of claim 1, wherein the association is maintained in a database accessible by the agent, wherein the agent caches the association, and wherein the determining the alias checks the cached association to facilitate rapid determination of the alias.

7. The method of claim 1, wherein the source virtualized universe environment application is selected from the group consisting of the email virtualized universe environment application, the online gaming virtualized universe environment application, and the instant messaging virtualized universe environment application, and wherein the target virtualized universe environment application is a different virtualized universe environment application of the email virtualized universe environment application, online gaming virtualized universe environment application, and instant messaging virtualized universe environment application than the source virtualized universe environment application.

8. A computer program product comprising:
a non-transitory computer-readable storage medium storing program instructions for execution to perform a method comprising:
obtaining an association between a first user of a virtualized universe environment and a plurality of aliases for the first user for use in the virtualized universe environment, the plurality of aliases being for use by the first user in different virtualized universe environment applications of a plurality of virtualized universe environment applications of the virtualized universe environment, the plurality of virtualized universe environment applications comprising an email virtualized universe environment application, an online gaming virtualized universe environment application, and an instant messaging virtualized universe environment application;

based on the first user initiating sending, to second user, a message from a source virtualized universe environment application of the plurality of virtualized universe environment applications to a target virtualized universe environment application of the plurality of virtualized universe environment applications, the first user logged into the source virtualized universe environment application and the source virtualized universe environment application and target virtualized universe environment application being different virtualized universe environment applications of the plurality of virtualized universe environment applications, determining, by an agent of the client system, an alias, of the plurality of aliases for the first user, to associate with the message to identify for the second user a sending alias of the message, wherein the determined alias to associate with the message is a different alias than an alias under which the first user is logged into the source virtualized universe environment application and the determined alias to associate with the message is for an account for the first user in a different virtualized universe environment application of the plurality of virtualized universe environment applications than the source virtualized universe environment application, and wherein the determining the alias to associate with the message comprises making a determination of the alias based on checking at least one rule of one or more rules specifying circumstances under which the plurality of aliases for the first user are to be used in sending messages;

registering permission for the first user to use the determined alias in sending messages, the registering being based on receiving a message from the first user as the first user is logged into the virtualized universe environment application for which the determined alias is used; and associating the determined alias with the message to identify for the second user the sending alias for the message as being the determined alias.

9. The computer program product of claim 8, wherein the checking proceeds according to a prioritized rule evaluation order for the one or more rules.

10. The computer program product of claim 8, wherein the making the determination of the alias is based further on target information for the message, the target information comprising context of the message.

11. The computer program product of claim 8, wherein the message is an instant message.

12. The computer program product of claim 8, wherein the agent comprises a name conversion agent and wherein the associating comprises modifying, by the agent, identify information of the message to indicate the determined alias.

13. The computer program product of claim 8, wherein the association is maintained in a database accessible by the agent, wherein the agent caches the association, and wherein the determining the alias checks the cached association to facilitate rapid determination of the alias.

14. The computer program product of claim 8, wherein the source virtualized universe environment application is selected from the group consisting of the email virtualized universe environment application, the online gaming virtualized universe environment application, and the instant messaging virtualized universe environment application, and wherein the target virtualized universe environment application is a different virtualized universe environment application of the email virtualized universe environment application, online gaming virtualized universe environment application, and instant messaging virtualized universe environment application than the source virtualized universe environment application.

15. A computer system comprising:
a processor; and
a memory storing program instructions for execution to perform a method, the method comprising:
obtaining an association between a first user of a virtualized universe environment and a plurality of aliases for the first user for use in the virtualized universe environment, the plurality of aliases being for use by the first user in different virtualized universe environment applications of a plurality of virtualized universe environment applications of the virtualized universe environment, the plurality of virtualized universe environment applications comprising an email virtualized universe environment application, an online gaming virtualized universe environment application, and an instant messaging virtualized universe environment application;

based on the first user initiating sending, to a second user, a message from a source virtualized universe environment application of the plurality of virtualized universe environment applications to a target virtualized universe environment application of the plurality of virtualized universe environment applications, the first user logged into the source virtualized universe environment application and the source virtualized universe environment application and target virtualized universe environment application being different virtualized universe environment applications of the plurality of virtualized universe environment applications, determining, by an agent of the client system, an alias, of the plurality of aliases for the first user, to associate with the message to identify for the second user a sending alias of the message, wherein the determined alias to associate with the message is a different alias than an alias under which the first user is logged into the source virtualized universe environment application and the determined alias to associate with the message is for an account for the first user in a different virtualized universe environment application of the plurality of virtualized universe environment applications than the source virtualized universe environment application, and wherein the determining the alias to associate with the message comprises making a determination of the alias based on checking at least one rule of one or more rules specifying circumstances under which the plurality of aliases for the first user are to be used in sending messages;

registering permission for the first user to use the determined alias in sending messages, the registering being based on receiving a message from the first user as the first user is logged into the virtualized universe environment application for which the determined alias is used; and associating the determined alias with the message to identify for the second user the sending alias for the message as being the determined alias.

16. The computer system of claim 15, wherein the message is an instant message.

17. The computer system of claim 15, wherein the source virtualized universe environment application is selected from the group consisting of the email virtualized universe environment application, the online gaming virtualized universe environment application, and the instant messaging virtualized universe environment application, and wherein the target virtualized universe environment application is a different virtualized universe environment application of the email virtualized universe environment application, online gaming virtualized universe environment application, and instant messaging virtualized universe environment application than the source virtualized universe environment application.

18. The computer system of claim 15, wherein the checking proceeds according to a prioritized rule evaluation order for the one or more rules.

19. The computer system of claim 15, wherein the making the determination of the alias is based further on target information for the message, the target information comprising context of the message.

20. The computer system of claim 15, wherein the association is maintained in a database accessible by the agent, wherein the agent caches the association, and wherein the determining the alias checks the cached association to facilitate rapid determination of the alias.

* * * * *